(12) United States Patent
Suzuki et al.

(10) Patent No.: US 10,114,272 B2
(45) Date of Patent: Oct. 30, 2018

(54) CAMERA MODULE AUTOFOCUS ACTUATOR AND CONTROL METHOD THEREOF

(71) Applicant: ACTUATOR SOLUTIONS GMBH, Gunzenhausen (DE)

(72) Inventors: Yusuke Suzuki, Yokohama (JP); Markus Koepfer, Stoedtlen-Regelsweiler (DE); Romaric Peri, Gunzenhausen (DE); Tom Nicolaisen, Gunzenhausen (DE); Alex Chen, Gunzenhausen (DE)

(73) Assignee: ACTUATOR SOLUTIONS GMBH, Gunzenhausen (DE)

( * ) Notice: Subject to any disclaimer, the term of this patent is extended or adjusted under 35 U.S.C. 154(b) by 0 days.

(21) Appl. No.: 15/516,345

(22) PCT Filed: Nov. 9, 2015

(86) PCT No.: PCT/IB2015/058633
§ 371 (c)(1),
(2) Date: Mar. 31, 2017

(87) PCT Pub. No.: WO2016/075606
PCT Pub. Date: May 19, 2016

(65) Prior Publication Data
US 2017/0299945 A1    Oct. 19, 2017

(30) Foreign Application Priority Data

Nov. 12, 2014  (IT) ............................. MI2014A1945
Jan. 9, 2015   (IT) ............................. MI2015A0007

(51) Int. Cl.
*G02B 15/14* (2006.01)
*G03B 17/02* (2006.01)
(Continued)

(52) U.S. Cl.
CPC ............ *G03B 17/02* (2013.01); *F03G 7/065* (2013.01); *G03B 13/36* (2013.01)

(58) Field of Classification Search
CPC ........ G02B 7/102; G02B 7/282; G03B 13/36; H04N 5/23212
See application file for complete search history.

(56) References Cited

U.S. PATENT DOCUMENTS 8,159,762 B2    4/2012   Lim et al.
9,310,584 B2 *  4/2016   Lam ..................... G02B 7/04
(Continued)

FOREIGN PATENT DOCUMENTS

EP    1630582 A1    8/2005
EP    2239610 A1    10/2010
(Continued)

OTHER PUBLICATIONS

International Search Report and Written Opinion for International Application No. PCT/IB2015/058633 filed Nov. 9, 2015 on behalf of Actuator Solutions GmbH. dated Feb. 1, 2016. 12 pages.
(Continued)

*Primary Examiner* — Bumsuk Won
*Assistant Examiner* — Tamara Y Washington
(74) *Attorney, Agent, or Firm* — Steinfl + Bruno, LLP (57) ABSTRACT

An autofocus actuator for camera modules and control method thereof, the autofocus actuator incorporating a shape memory alloy wire as actuating element, at least 4 spheres as sliding aids, and including a return elastic element mounted between an autofocus housing and a lens carrier and exerting a force only in the optical axis direction.

16 Claims, 6 Drawing Sheets

(51) Int. Cl.
*F03G 7/06* (2006.01)
*G03B 13/36* (2006.01)

(56) References Cited

U.S. PATENT DOCUMENTS

| | | | |
|---|---|---|---|
| 2006/0149194 A1* | 7/2006 | Conston | A61B 17/32002 |
| | | | 604/294 |
| 2011/0091193 A1 | 4/2011 | Lim et al. | |
| 2011/0103784 A1 | 5/2011 | Hashizume et al. | |
| 2011/0204746 A1 | 8/2011 | Kume | |
| 2012/0039590 A1* | 2/2012 | Jacobsen | G03B 3/10 |
| | | | 396/133 |
| 2012/0089180 A1* | 4/2012 | Fathi | B41J 2/17559 |
| | | | 606/214 |
| 2013/0039460 A1* | 2/2013 | Levy | G01N 21/211 |
| | | | 378/44 |
| 2013/0156412 A1 | 6/2013 | Naito et al. | |
| 2013/0293969 A1* | 11/2013 | Wu | G02B 7/08 |
| | | | 359/698 |

FOREIGN PATENT DOCUMENTS

| | | | |
|---|---|---|---|
| WO | 2007113478 A1 | 10/2007 | |
| WO | 2008099156 A2 | 8/2008 | |
| WO | 2011122438 A1 | 10/2011 | |

OTHER PUBLICATIONS

International Preliminary Report on Patentability for International Application No. PCT/IB2015/058633 filed Nov. 9, 2015 on behalf of Actuator Solutions GmbH. dated Nov. 12, 2016. 9 pages.

* cited by examiner

CAMERA MODULE AUTOFOCUS ACTUATOR AND CONTROL METHOD THEREOF

CROSS-REFERENCE TO RELATED APPLICATIONS

The present application is the U.S. National Stage of International Patent Application No. PCT/IB2015/058633 filed on Nov. 9, 2015 which, in turn, claims priority to Italian Patent Application No. MI2015A000007 filed on Jan. 9, 2015 and Italian Patent Application No. MI2014A001945 filed on Nov. 12, 2014.

The present invention is inherent to a novel and improved camera module autofocus (AF) actuator incorporating a shape memory alloy (SMA) wire as actuating element, with particular reference to cellular phones camera modules, and to a control method thereof.

Generally speaking the use of shape memory alloy wires as actuating elements provides various advantages with respect to other actuating systems in terms of weight, power consumption, costs.

These advantages have already been recognized also in the field of camera modules and have been the subject of various patent applications, such as international patent applications WO 2007/113478, WO 2011/122438 and U.S. Pat. No. 8,159,762 all describing camera modules with a shape memory alloy wire in contact with the lens holder (sometimes referred in the field as lens barrel) and fixed to the camera module housing. The controlled heating via Joule effect of the shape memory alloy wire causes its contraction and the movement of the lens holder with respect to the housing.

The two above-referenced international patent applications do not address the frictional phenomena between housing and lens barrel and the related problems in terms of actuator lifetime, while this aspect is instead tagged in U.S. Pat. No. 8,159,762 by means of rolling members interposed between the housing and the barrel and an oblique return spring exerting a force with a component perpendicular to the optical axis to ensure the contact between the rolling members and the lens barrel. Even though this solution is an improvement in terms of frictional force management, this significant and constant perpendicular component causes itself a stress on the structure, and in frequently used actuating systems, such as in a camera module AF, it may lead to premature failures or to compensate by using upgraded components, for example by using wires bigger than required. On the other hand, the presence of this force component perpendicular to the optical axis is a prominent feature of this prior art actuator, to the point that it is contained in the characterizing portion of the independent claim of U.S. Pat. No. 8,159,762. Another drawback is associated to the manufacturing of such mechanical structures, as they cannot be made by adding the elements on top of each other but require the making and reciprocal coupling of sub-assemblies.

Purpose of the present invention is to overcome the drawback still present in the known art in terms of dealing with the frictional forces in a SMA-based autofocus actuator, and in a first aspect thereof consists in a camera module autofocus actuator comprising:

a housing,
a movable lens carrier having a protrusion with an apex for lodging a shape memory alloy wire,
a shape memory alloy wire,
at least four spheres,
a bottom plate,
two electric terminals at a different height with respect to the protrusion apex,
a return elastic element,
and in which actuator
the bottom plate and the housing are fixed to each other, defining an autofocus main body,
the two electric terminals are fixed onto the autofocus main body,
the shape memory alloy wire is in contact with the lens carrier protrusion apex and its extremities are locked to the two electric terminals on the main body,
the housing and the movable lens carrier are aligned via at least two side channels defining at least two guide channels containing and holding the spheres,
the return elastic element is mounted between the housing and the lens carrier,
the return elastic element exerting a force only in the optical axis direction.

As per above description, the two electric terminals are fixed and held to the main body (housing+bottom plate) and therefore these elements may be equivalently fixed onto the housing or onto the bottom plate, notwithstanding the requirement of being at a different height with respect to the lens carrier protrusion apex.

One of the most common variants for a camera module AF actuator according to the present invention envisions the presence of a Flexible Printed Circuit board (FPC) that jointly with a magnet and a Hall sensor provides information about the lens carrier displacement and position. It is to be underlined that such elements are optional, since other equivalent technical solutions may be employed, such as a resistance feedback of the shape memory alloy, as described for example in the international patent application number WO 2008/099156.

The invention will be further illustrated with the help of the following figures, where.

In the above figures the dimensions and dimensional ratio of the elements may not be correct and in some cases, such as for example with regards to the shape memory alloy wire diameter, have been altered in order to enhance the drawing comprehension.

Figure 1:
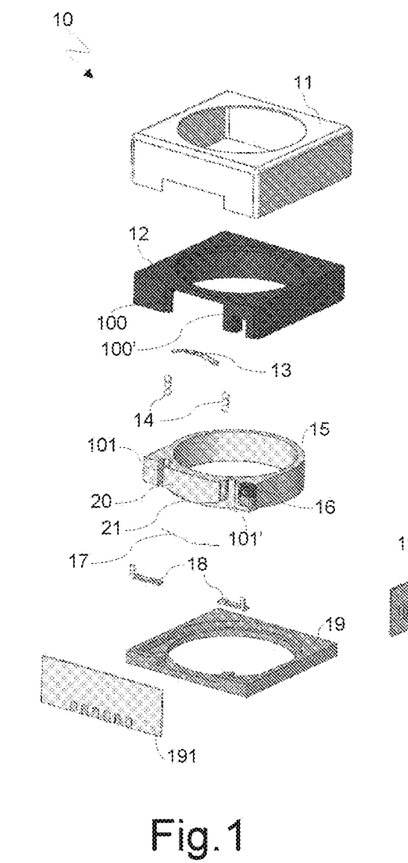
FIGS. 1 and 2 are vertically exploded perspective views of the elements constituting an AF actuator according to a first embodiment of the present invention.
Figure 2:
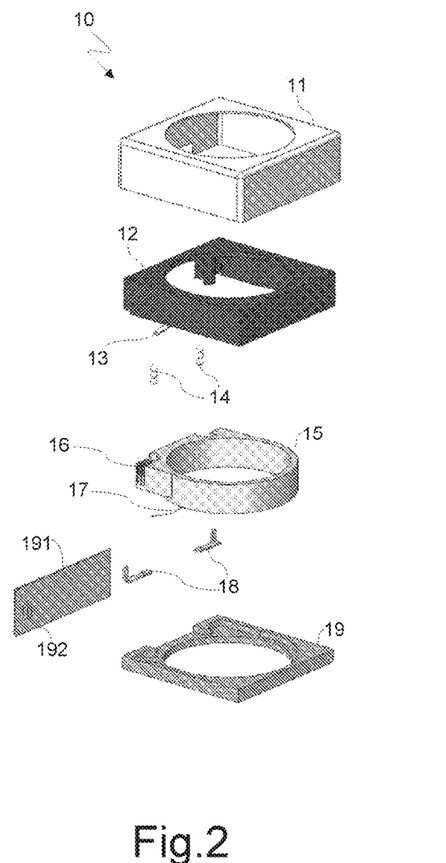

Perspective views of the elements incorporated in a first embodiment of an AF actuator 10 according to the present invention are shown in FIGS. 1 (front view) and 2 (side view). In this representation the elements are vertically separated to allow their identification. In particular the AF actuator 10 comprises a shield can 11, a housing 12, a return spring 13, two sets of rolling spheres 14, a movable lens carrier 15, a magnet 16, a shape memory alloy wire 17, two terminals 18, a bottom plate 19, a Flexible Printed Circuit board (FPC) 191, a Hall sensor 192.

The movable lens carrier 15 presents a frontal protrusion 20 for housing the shape memory alloy wire 17, in this case the protrusion has a lower apex 21 and the shape memory alloy wire 17 is held beneath it by the restraint action made by the two terminals 18, placed at a higher height (along the optical axis). A variant envisions the use of an upper apex with the shape memory alloy wire held above it and the terminals placed at a lower height.

Housing 12 and movable lens carrier 15 have side channels 100, 100', 101, 101' vertically aligned in pairs 100-101 and 100'-101' and defining two guide channels for holding the spheres 14. These elements have been indicated in the perspective views of FIGS. 1 and 2, and side channels 100-100' on housing 12 are well recognizable in the view from above (see following FIG. 4).

The AF structure shown in FIGS. 1 and 2 comprises elements, such as a magnet 16 and a Hall sensor 192 for detecting the position of the movable lens carrier 15, that are entirely optional even though they are representative of the preferred embodiment of an AF actuator according to the present invention.

Figure 3:
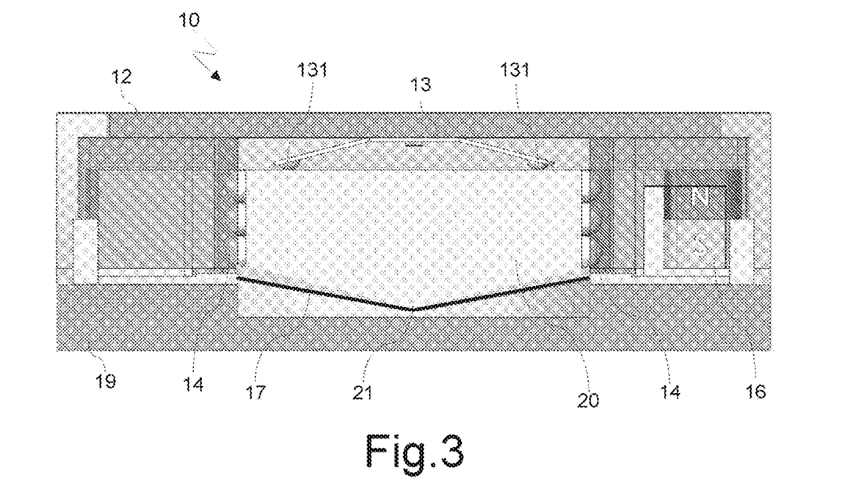
FIG. 3 is a front see-through view of the AF actuator of FIGS. 1 and 2 in the assembled condition.

FIG. 3 shows a front see-through view of the assembled actuator 10 that comprises magnet 16 with an indication of its North-South polarity and a preferred configuration for the return spring 13, in the form of a leaf spring with rounded contact points 131 in order to exert a distributed force on the lens carrier 15.

In the rest condition the actuator is in the so-called infinity focus position; when the shape memory alloy wire 17 is heated by current passage it shortens and exerts a force onto lens carrier 15 moving it upwards such that the lens is focused up to the so-called macro position (i.e. focusing on a nearby plane). When the current supply stops, the return elastic element 13 exerting a vertical return force opposing the SMA traction pushes back the lens carrier 15 to the infinity position. Infinity and macro represent the two AF extreme position and therefore correspond to the amount of adjustment that the AF actuator shall be capable to achieve.

A position sensor and readout are also present to determine the correct equilibrium position during the AF actuator operation, also in this case exemplified by magnet 16 anchored to the lens carrier 15 and the Hall sensor 192 attached to the FPC board 191 (FIG. 2). The FPC board will provide current to the SMA wire 17 through terminals 18 for its activation via Joule effect according to the Hall sensor readout.

It is important to underline that with the AF actuator configuration according to the first embodiment of the present invention the return elastic means 13 exerts a force only in the vertical direction, and it is the geometry of the AF actuator that ensures the spheres alignment and confinement in the guide channels.

As mentioned with regards to FIGS. 1 and 2, also the reciprocal configuration may be suitably employed, i.e. upper apex and lower terminals; in this case the return elastic element is beneath the lens carrier as the shape memory alloy wire will exert a downward traction (up-down direction defined with respect to the lowest element of the actuator, i.e. the bottom plate). In this case the rest position corresponds to macro, while the fully activated position corresponds to infinity.

Figure 4:
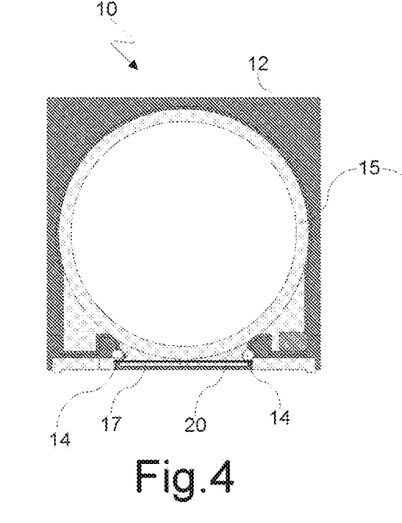
FIG. 4 is a sectional view from above of the AF actuator of FIG. 3.
Figure 5:
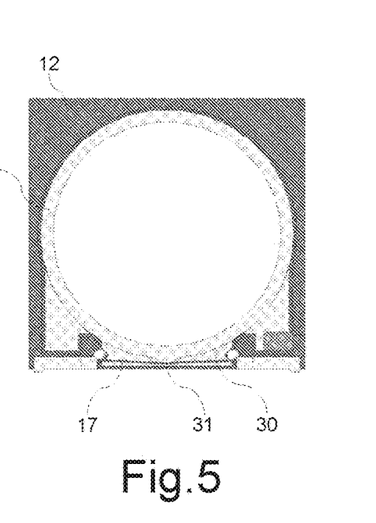
FIG. 5 is a sectional view from above of a preferred variant for the AF actuator of FIG. 3.

FIG. 4 shows a sectional view from above of the actuator depicted in FIG. 3, while FIG. 5 shows a preferred variant of the actuator in which the frontal protrusion 30 of the lens carrier 15 includes an apex 31 providing a slight offsetting, perpendicularly to the optical axis and radially outwards, between the shape memory alloy wire and the terminals, so that they do not to lie in a same vertical plane parallel to the optical axis. In other words, protrusion 30 is shaped such that the SMA wire follows a V-shaped path not only in the vertical plane (FIG. 3) but also in the horizontal plane (FIG. 5) so as to exert a traction, upon activation, not only in the up-down direction but also in the front-rear direction.

With such a horizontal angle the rolling spheres 14 will be put in the best operating condition and subjected also to a minimal orthogonal (with respect to the optical axis) force. This configuration to a certain extent and by an operative standpoint is the opposite with respect to the one shown in the above-referenced U.S. Pat. No. 8,159,762 as in this case it is the SMA wire that exerts the force in the direction orthogonal to the optical axis and not the return spring. Moreover, such an orthogonal component is minimal and exerted only when needed, i.e. during the AF activation, and not permanently as in the case of a transversal pulling by the elastic return means in the prior art.

The AF actuator according to the present invention is not restricted to a specific type of shape memory alloy wires, but any shape memory alloy wires activated by Joule effect may be usefully employed. Having said that, preferred is the use of shape memory alloy wires made with Ni—Ti alloys widely known in the field with the name of Nitinol, with diameters ranging from 10 μm to 50 μm and commercially available from a variety of sources, for examples the wires sold under the trade name Smartflex by SAES Getters S.p.A., of particular preference is the use of 25 μm wires.

With regards to the material of the spheres, there is no specific requirement apart from using a material with sufficient hardness, such as ceramic or metal (preferred stainless steel). As to the number of spheres, preferred is the use of the same number of spheres in each of the two guide channels, with a number of at least 2 spheres per channel. Preferably the number of spheres per channel is not higher than 5.

With regards to the spheres diameter, it is preferably comprised between 30 and 150 μm, most preferably comprised between 40 and 60 μm.

In the embodiment envisioning the use of an offsetting protrusion apex 31, the latter moves the shape memory alloy wire median point far away from the optical axis by a distance comprised between 0.3 and 1 mm.

Figure 6:
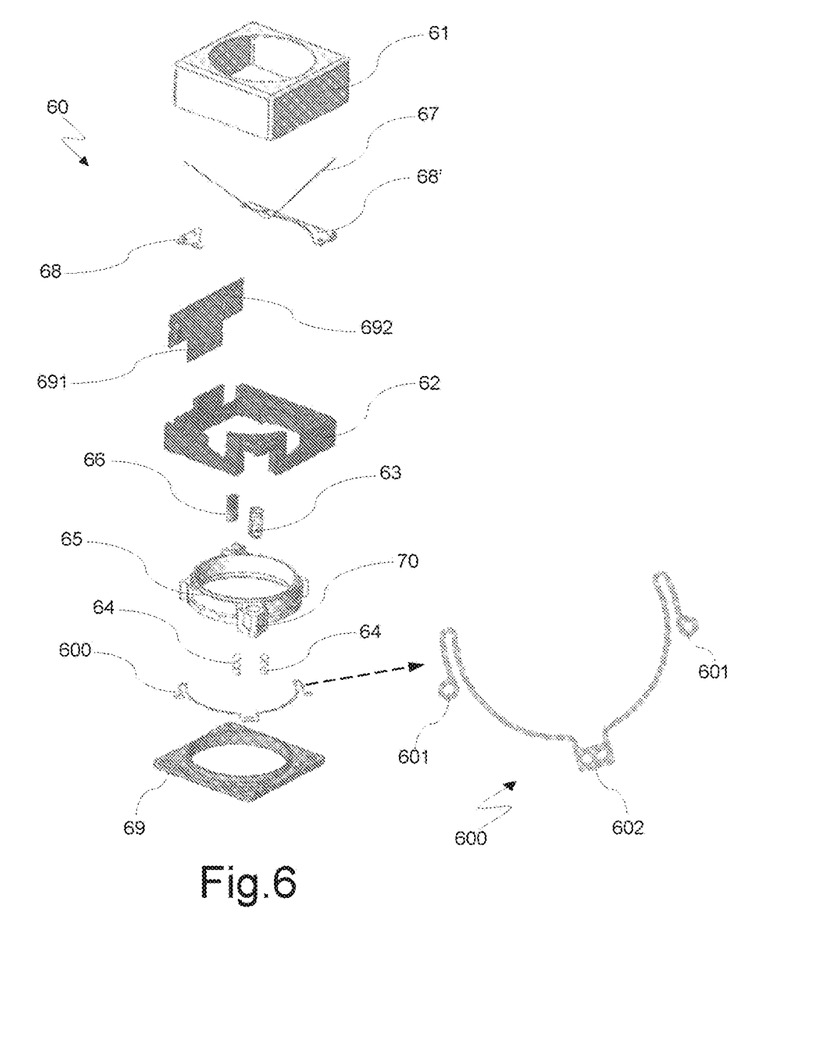
FIG. 6 is a vertically exploded perspective view of the elements constituting an AF actuator according to a second embodiment of the present invention, with an enlarged detail of one of said elements.

A second embodiment 60 of an AF actuator according to the present invention is shown in the exploded view of FIG. 6, with elements corresponding to the elements of the first embodiment that are indicated by correspondingly numbered references. In particular the AF actuator 60 comprises a shield can 61, a housing 62, a return spring 63, two sets of rolling spheres 64, a movable lens carrier 65, a magnet 66, a shape memory alloy wire 67, two terminals 68, 68', a bottom plate 69 and a Flexible Printed Circuit board (FPC) 691 carrying a Hall sensor 692.

Some of the distinguishing features of this embodiment with respect to the embodiment shown in FIGS. 1 and 2 are in particular the shape of housing 62 and of the lens carrier 65, with terminals 68, 68' connected onto two adjacent faces thereof and a protrusion 70 formed on the lens carrier 65 in correspondence with a corner of housing 62. Similarly, as clearly shown in FIGS. 7 and 8, the guide channels for holding the spheres 64 are formed on the sides of the corner protrusion 70, which is also provided with an apex 71 for holding the SMA wire 67.

Another difference in this second embodiment is the presence of a so-called flexure 600, i.e. a thin element made of an elastic metallic material (e.g. steel, copper, bronze), arranged between the lens carrier 65 and the bottom plate 69. As better shown in the enlarged detail of FIG. 6, flexure 600 has a substantially semi-circular shape with end portions 601 that are bent over outwards and a middle portion 602 with a rectangular enlargement projecting outwards.

Figure 7:
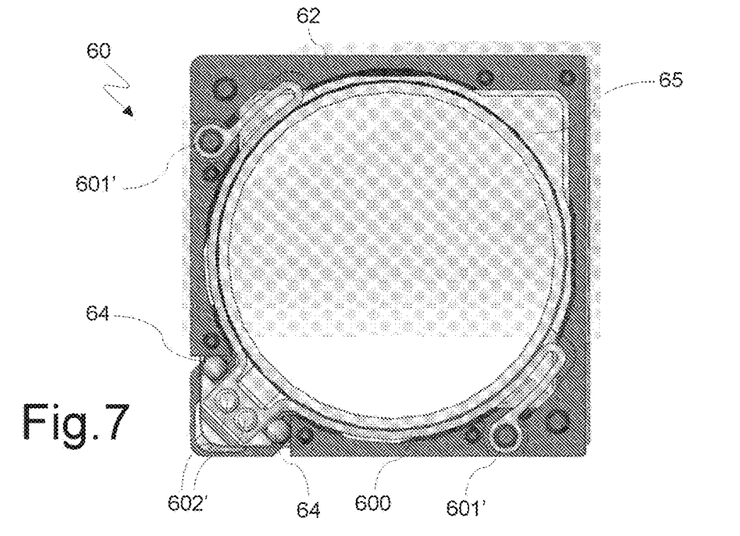
FIG. 7 is a bottom view of the AF actuator of FIG. 6, without the top and bottom elements, in the assembled condition.
Figure 8:
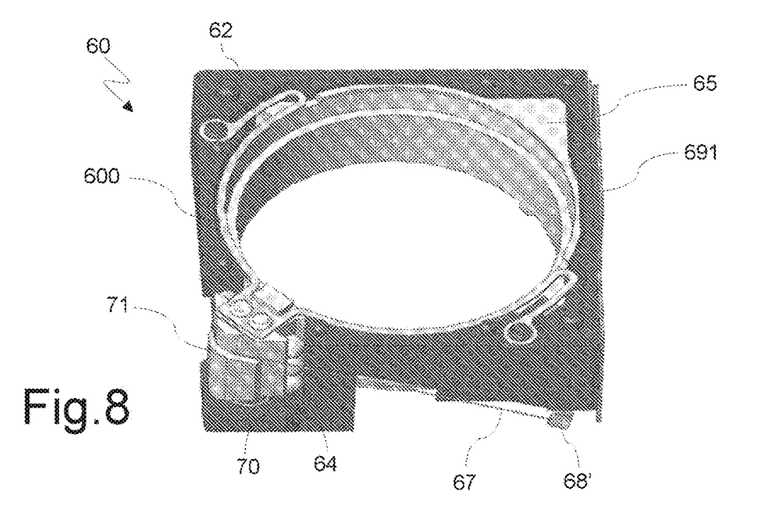
FIG. 8 is a bottom perspective view of the AF actuator of FIG. 7.

Both the end and middle portions 601 and 602 include holes for connecting flexure 600 to housing 62 and lens carrier 65 respectively, as shown in FIGS. 7 and 8. More specifically, flexure 600 is connected to housing 62 through two pins 601' that are formed on the bottom thereof, close to the two corners adjacent to the lens carrier protrusion 70, and which engage corresponding holes formed in the end portions 601. Similarly, flexure 600 is also connected to the lens carrier 65 through a third connection point at the flexure middle portion 602, where a pair of holes allow the rectangular enlargement to be fitted on corresponding pins 602' formed on the bottom of the lens carrier protrusion 70.

More details on the flexure and its presence in an AF module controlled by a shape memory alloy wire can be found in the above-mentioned international patent application WO 2007/113478. Generally speaking, flexure 600 improves the stability of the AF actuator, such advantage being of particular relevance when the AF module is controlled via the Hall sensor and magnet distance. In fact, small lateral displacements due to rotation of the lens carrier 65 around the optical axis may induce feedback errors, and the presence of flexure 600 prevents such rotational displacements and improves the AF performances.

Apart from the presence of the flexure, which is anyway an optional element, the main difference between the first and second embodiment is the fact that in the former (FIGS. 1 and 2) the lens carrier protrusion apex 21 is essentially located in the middle of one of the housing faces, while in the latter (FIGS. 6, 7 and 8) the lens carrier protrusion apex 71 is located at one of the corners of housing 62.

Figure 9:
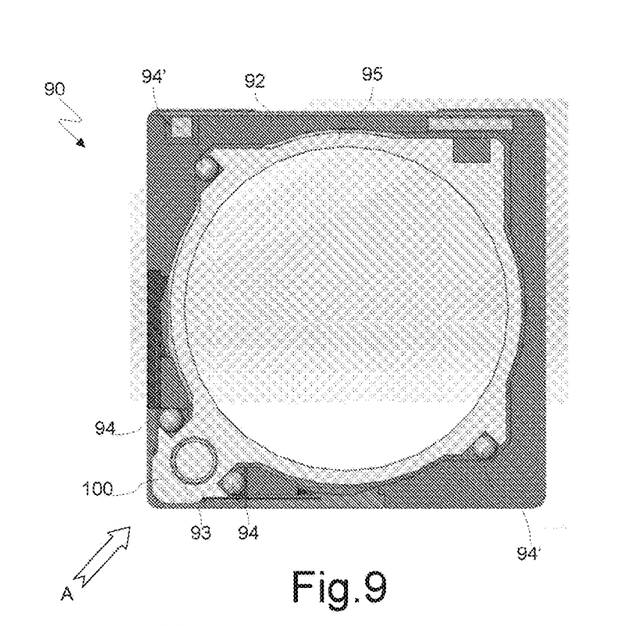
FIG. 9 is a top view of a preferred variant for the AF actuator of FIG. 7.

A preferred variant of the above-described second embodiment, again with corresponding elements indicated by correspondingly numbered references, envisions the presence of two additional guide channels in the two corners adjacent to the lens carrier protrusion for a total of four guide channels, each containing rolling spheres. This particular variant 90 is shown in FIGS. 9 and 10 to have not only spheres 94 corresponding to spheres 64, i.e. arranged on the sides of the lens carrier protrusion 100, but also two other sets of spheres 94' (only two spheres per set in the illustrated example) that are located in opposite corner positions, always between housing 92 and the lens carrier 95.

Figure 10:
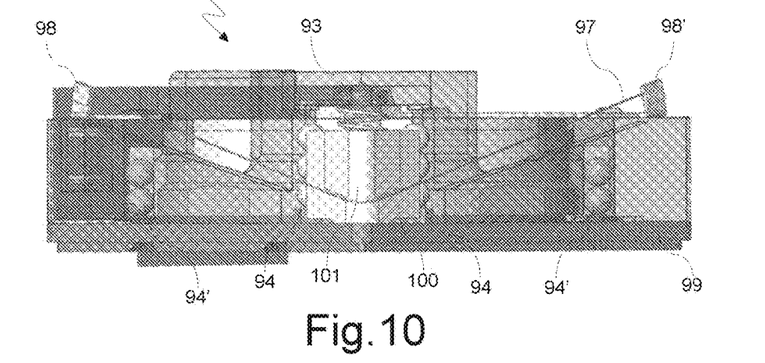
FIG. 10 is a see-through view of the AF actuator of FIG. 9 along the direction of arrow A.

These spheres 94, 94' are also shown in the see-through view of FIG. 10 that shows also the lens carrier protrusion apex 101 and the shape memory alloy wire 97 connected to terminals 98, 98' located on two opposite corners of housing 92, as well as the return spring 93 received within the corner protrusion 100. It is to be underlined that the variant shown in FIGS. 9 and 10 is characterized by the spheres locations, whereas the number of spheres per location as depicted and shown in the figures is merely indicative.

It should be noted that apex 71, 101 could also provide a slight offsetting of SMA wire 67, 97 perpendicularly to the optical axis and radially outwards, same as apex 31 in the variant of FIG. 5, so as to put spheres 64, 94 in the best operating condition.

In a second aspect thereof the invention consist in a control method for an AF actuator using spheres as an aid for the sliding of the lens carrier in the housing, and in particular in a control method comprising an initialization phase wherein the shape memory alloy wire is activated to move the lens carrier to a first end position, e.g. corresponding to the macro position, and then deactivated to move the lens carrier to a second end position, e.g. corresponding to the infinity position in the illustrated embodiments.

This operation guarantees a reset of the AF actuator and ensures that the rolling spheres are in the best starting position.

Figure 11:
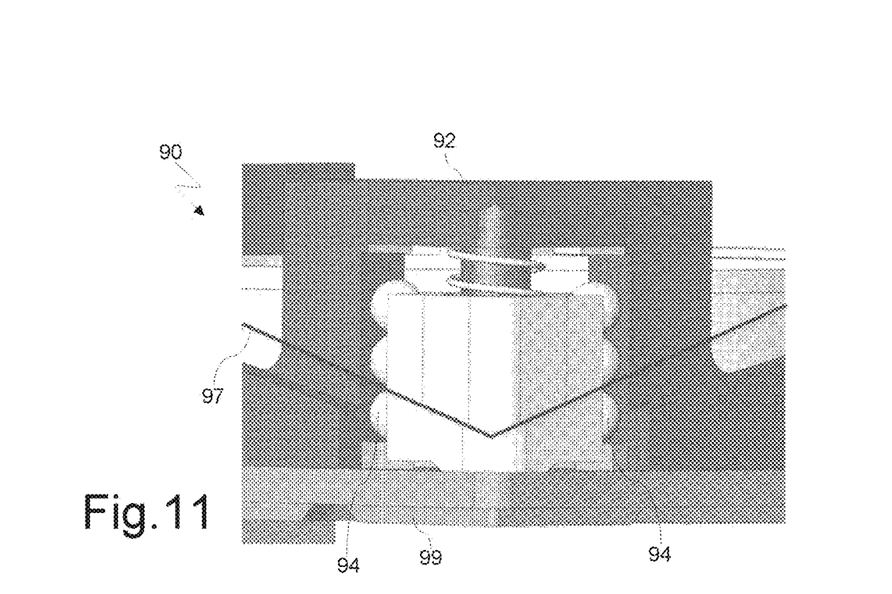
FIGS. 11 and 12 are enlarged partial views of the AF actuator of FIG. 9 along the direction of arrow A, showing the detail of the rolling members in the two extreme AF actuator positions.
Figure 12:
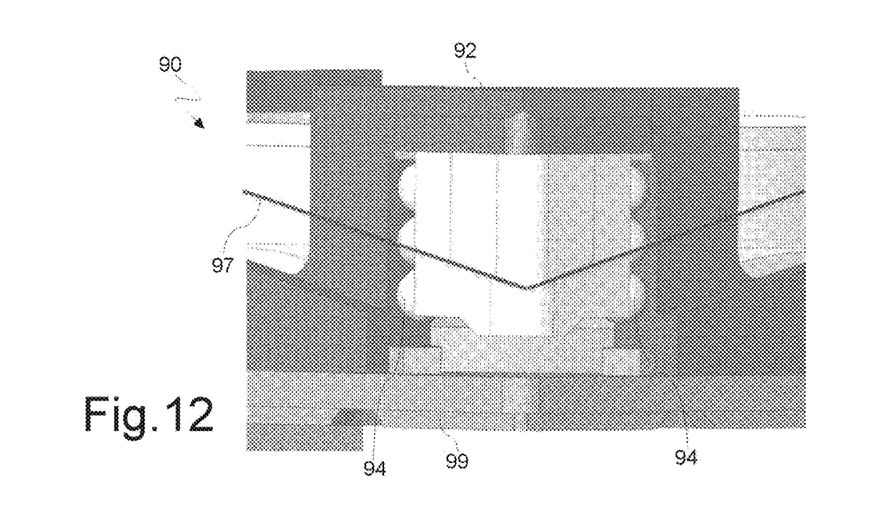

FIGS. 11 and 12 show an enlarged detail of the AF actuator illustrated in FIGS. 9 and 10, with spheres 94 adjacent to the lens carrier protrusion 100 in the infinity position (FIG. 11) and in the macro position (FIG. 12). In FIG. 11 the end stop for the lower spheres of the sets is the bottom plate 99, whereas in FIG. 12 the end stop for the upper spheres is housing 92.

The invention claimed is:

1. A camera module autofocus actuator comprising:
a housing,
a movable lens carrier having a protrusion with an apex for lodging a shape memory alloy wire,
a shape memory alloy wire,
at least four spheres,
a bottom plate,
two electric terminals at a different height with respect to said protrusion apex,
a return elastic element,
wherein:
said bottom plate and said housing are fixed to each other, defining an autofocus main body,
said two electric terminals are fixed onto said autofocus main body,
said shape memory alloy wire is in contact with the lens carrier protrusion apex and its extremities are locked to the two electric terminals on the main body,
the housing and said movable lens carrier are aligned via at least two side channels defining at least two guide channels containing and holding said spheres,
said movable lens carrier is configured to house at least one lens having an optical axis parallel to the guide channels,
said return elastic element is mounted between the housing and the lens carrier, and the return elastic element exerts on the lens carrier a force only along a direction parallel to the optical axis.

2. The camera module autofocus actuator according to claim 1, wherein said two electric terminals are located on the same face of the autofocus main body.

3. The camera module autofocus actuator according to claim 1, wherein said two electric terminals are located on two adjacent faces of the autofocus main body.

4. The camera module autofocus actuator according to claim 1, wherein the number of guide channels is two.

5. The camera module autofocus actuator according to claim 1, wherein the number of guide channels is four.

6. The camera module autofocus actuator according to claim 1, further comprising a flexure located between the housing and the movable lens carrier.

7. The camera module autofocus actuator according claim 1, wherein the number of spheres per guide channel is not higher than 5 and not lower than 2.

8. The camera module autofocus actuator according to claim 1, wherein the spheres have a diameter comprised between 30 and 150 µm.

9. The camera module autofocus actuator according to claim 1, wherein the return elastic element is a leaf spring.

10. The camera module autofocus actuator according to claim 9, wherein said leaf spring has rounded contact points.

11. The camera module autofocus actuator according to claim 1, further comprising a magnet fixed onto the movable lens carrier and a Hall sensor fixed onto a flexible printed circuit board fixed to the housing.

12. The camera module autofocus actuator according to claim 1, wherein the shape memory alloy wire is made of a Ni—Ti alloy and has a diameter comprised between 10 and 50 µm.

13. The camera module autofocus actuator according to claim 1, wherein the movable lens carrier has a protrusion with an apex that provides a slight offsetting perpendicularly to the optical axis and radially outwards, thus moving the shape memory alloy wire median point far away from the optical axis by a distance comprised between 0.3 mm and 1 mm.

14. A control method for the camera module autofocus actuator according to claim 1 comprising:
   an initialization phase wherein the shape memory alloy wire is activated to move the movable lens carrier to a first end position; and then
   a deactivation phase to move the lens carrier to a second end position.

15. The control method according to claim 14, wherein the position of the lens carrier is determined by a flexible printed circuit board via a Hall sensor and a magnet.

16. The control method according to claim 14, wherein the position of the lens carrier is determined by a resistance measurement of the shape memory alloy wire.

* * * * *